United States Patent
Lloyd et al.

(10) Patent No.: US 11,208,207 B2
(45) Date of Patent: Dec. 28, 2021

(54) VERTICAL TAKEOFF AND LANDING (VTOL) AIRCRAFT

(71) Applicant: Bell Helicopter Textron Inc., Fort Worth, TX (US)

(72) Inventors: John Lloyd, Arlington, TX (US); Kirk Landon Groninga, Keller, TX (US)

(73) Assignee: Textron Innovations Inc., Providence, RI (US)

( * ) Notice: Subject to any disclaimer, the term of this patent is extended or adjusted under 35 U.S.C. 154(b) by 139 days.

(21) Appl. No.: 15/860,601

(22) Filed: Jan. 2, 2018

(65) Prior Publication Data

US 2018/0208305 A1 Jul. 26, 2018

Related U.S. Application Data

(60) Provisional application No. 62/592,014, filed on Nov. 29, 2017, provisional application No. 62/415,141, filed on Oct. 31, 2016.

(51) Int. Cl.
*B64C 29/00* (2006.01)
*B64C 11/00* (2006.01)
(Continued)

(52) U.S. Cl.
CPC .......... *B64C 29/0033* (2013.01); *B60L 50/61* (2019.02); *B60L 50/90* (2019.02); *B64C 11/001* (2013.01); *B60L 2200/10* (2013.01)

(58) Field of Classification Search
CPC ... B64C 29/0033; B64C 11/001; B64C 29/00; B64C 29/0008; B64C 29/0016;
(Continued)

(56) References Cited

U.S. PATENT DOCUMENTS 2,961,189 A * 11/1960 Doak .................. B64C 29/0033
244/12.4
3,061,242 A * 10/1962 Zurawinski ......... B64C 29/0033
244/23 A
(Continued)

FOREIGN PATENT DOCUMENTS

WO WO-2020069582 A1 * 4/2020 ............. B64C 37/02

OTHER PUBLICATIONS

David Cenciotti, "F-18 Rudders During Takeoff", Oct. 25, 2009, The Aviationist, https://theaviationist.com/2009/10/25/f-18-rudders-during-take-off/ (Year: 2009).*

*Primary Examiner* — Richard R. Green
*Assistant Examiner* — William L Gmoser
(74) *Attorney, Agent, or Firm* — Lightfoot & Alford PLLC (57) ABSTRACT

Systems and methods include providing an aircraft with a flight control system, a hybrid electrical or hybrid hydraulic propulsion system, and three ducted fan configuration. Each of two ducted fore fans include a single rotor system having multiple rotor blades, and a single ducted aft fan includes dual, coaxial, counter-rotating rotor systems each having multiple rotor blades. The aircraft is a vertical takeoff and landing (VTOL) aircraft that is capable of operation in an airplane mode and a helicopter mode and designed to provide an urban air-taxi that would relieve ground traffic congestion, reduce carbon emissions, and increase productivity, thereby providing a faster, more efficient means of transportation.

19 Claims, 9 Drawing Sheets

(51) Int. Cl.
*B60L 50/61* (2019.01)
*B60L 50/90* (2019.01)

(58) Field of Classification Search
CPC ...... B64C 29/0041; B60L 53/12; B60L 50/90; B60L 50/61; B60L 2200/10
USPC .......................................................... 244/7 R
See application file for complete search history.

(56) References Cited

U.S. PATENT DOCUMENTS

| | | | | |
|---|---|---|---|---|
| 3,086,731 | A * | 4/1963 | Beckington | B64C 29/0091 244/52 |
| 8,152,096 | B2 * | 4/2012 | Smith | B64C 29/0033 244/12.4 |
| 8,930,044 | B1 * | 1/2015 | Peeters | B64C 19/00 701/2 |
| 9,499,266 | B1 * | 11/2016 | Garreau | B64C 39/068 |
| 2005/0133662 | A1 * | 6/2005 | Magre | B64C 29/0033 244/7 R |
| 2009/0045295 | A1 * | 2/2009 | Lundgren | B64C 29/0033 244/7 C |
| 2011/0315827 | A1 * | 12/2011 | Collins | B64C 29/0033 244/7 A |
| 2012/0091257 | A1 * | 4/2012 | Wolff | B64C 29/0033 244/12.4 |
| 2013/0009403 | A1 * | 1/2013 | Cornelius | F03D 9/00 290/55 |
| 2013/0099065 | A1 * | 4/2013 | Stuhlberger | B64C 29/0033 244/7 C |
| 2015/0314865 | A1 * | 11/2015 | Bermond | B64C 29/0033 244/17.27 |
| 2017/0369162 | A1 * | 12/2017 | Alzahrani | B64C 39/024 |
| 2020/0156780 | A1 * | 5/2020 | Varigas | B64C 3/10 |

* cited by examiner

VERTICAL TAKEOFF AND LANDING (VTOL) AIRCRAFT

CROSS-REFERENCE TO RELATED APPLICATIONS

The present application claims priority under 35 U.S.C. § 119(e) to U.S. Provisional Patent Application No. 62/415,141 filed on Oct. 31, 2016 by John Lloyd, entitled "VTOL Aircraft," and U.S. Provisional Patent Application No. 62/592,014 filed on Nov. 29, 2017 by John Lloyd, entitled "VTOL Aircraft," the disclosures of which are hereby incorporated by reference in their entireties.

STATEMENT REGARDING FEDERALLY SPONSORED RESEARCH OR DEVELOPMENT

Not applicable.

BACKGROUND

Rapid commercial growth and expansion of urban areas often increases the distance from one side of a metropolitan area to another. This rapid commercial growth and expansion often results in an increase in the population, further resulting in more congestion and emissions due to an increased number of vehicles on the current highway infrastructure. As technology further increases, such metropolitan areas will continue to grow, placing serious burden on the current highway infrastructure to handle the increased traffic and furthering the need for improved travel across a metropolitan area that reduces emissions while allowing faster, more convenient, and more efficient travel throughout a metropolitan area and/or between bordering states.

DETAILED DESCRIPTION

In this disclosure, reference may be made to the spatial relationships between various components and to the spatial orientation of various aspects of components as the devices are depicted in the attached drawings. However, as will be recognized by those skilled in the art after a complete reading of this disclosure, the devices, members, apparatuses, etc. described herein may be positioned in any desired orientation. Thus, the use of terms such as "above," "below," "upper," "lower," or other like terms to describe a spatial relationship between various components or to describe the spatial orientation of aspects of such components should be understood to describe a relative relationship between the components or a spatial orientation of aspects of such components, respectively, as the device described herein may be oriented in any desired direction.

Figure 1:
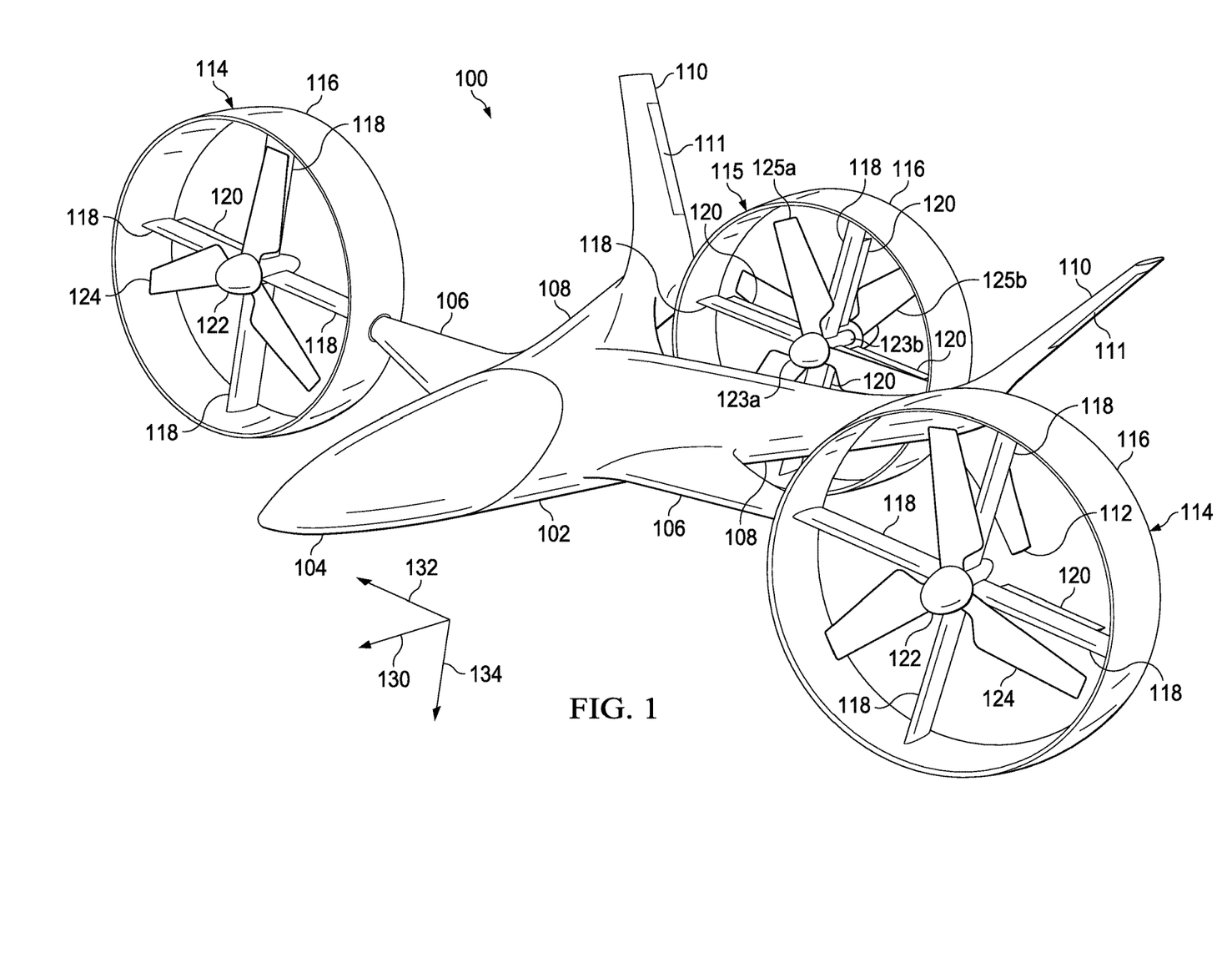
FIG. 1 is an oblique view of an aircraft according to this disclosure.

Referring now to FIG. 1, an oblique view of an aircraft 100 is shown according to this disclosure. Aircraft 100 is generally configured as a vertical takeoff and landing (VTOL) aircraft, more specifically a tiltrotor, that is operable in an airplane mode associated with forward flight and a helicopter mode associated with vertical takeoff from and landing to a landing zone. Aircraft 100 comprises a fuselage 102, a cockpit and/or passenger compartment 104, a plurality of wings 106 extending from the fuselage 102, rear supports 108 also extending from the fuselage 102 and comprising a topside tail 110 and a bottom side tail 112 to collectively form the empennage of the aircraft 100, a plurality of fore fans 114 carried by, supported by and/or otherwise coupled to the wings 106, and an aft fan 115 carried by, supported by, and/or otherwise coupled to and disposed between the rear supports 108.

The passenger compartment 104 may generally be configured to carry a pilot and a single passenger in a side by side seating arrangement with ingress and egress into the passenger compartment 104 accomplished via a slide away canopy at the front of the fuselage 102 that allows access to the passenger compartment 104. In some embodiments, the passenger compartment 104 may comprise additional passenger seating behind the pilot of the aircraft 100. However, in other embodiments, the aircraft 100 may be pilotless, such that all seating in the passenger compartment 104 is for passengers. Further, it will be appreciated that based on the configuration of the aircraft 100, the passenger compartment 104 may comprise only a single row of seating or may comprise multiple rows of seating configured to provide seating for up to six passengers.

The wings 106 of the aircraft 100 are configured to carry the fore fans 114. The fore fans 114 are supported by a rotatable shaft (not shown) extending at least partially through the wings 106 and coupled to the fore fans 114. The fore fans 114 may be selectively rotated with respect to the fuselage 102 by at least one actuator (also not shown, e.g. electric, electro-mechanical, magnetic, and/or hydraulic) in order to transition the aircraft 100 between the airplane mode and the helicopter mode. Generally, each of the two wings 106 carries a single fore fan 114. Each fore fan 114 comprises a duct 116 having a plurality of structural supports and/or struts 118. In some embodiments, the outer surfaces of the ducts 116 may be shaped to provide optimal and/or preferred flight characteristics in at least one of the airplane mode and the helicopter mode.

Additionally, in some embodiments, some and/or all of the struts 118 of each fore fan 114 may comprise an aileron 120. In the shown embodiment, however, only the outer horizontally oriented strut 118 of each fore fan 114 comprises an aileron 120. As such, it will be appreciated that during operation of the aircraft 100, yaw control about axis 134 may be provided through selective adjustment of the ailerons 120. Each fore fan 114 comprises a single rotor system 122 having a plurality of rotor blades 124 attached thereto. The rotor blades 124 are disposed within the duct 116 and configured to generate thrust when selectively rotated. In the shown embodiment, each rotor system 122 comprises three rotor blades 124. However, in other embodiments, each rotor system 122 may comprise two, four, five, six, seven, eight, and/or more rotor blades 124.

The rear supports 108 of the aircraft having the topside tails 110 and bottom side tails 112 collectively form the empennage of the aircraft 100. The aft fan 115 is supported by at least one rotatable shaft (not shown) extending at least partially through at least one of the rear supports 108 and coupled to the aft fan 115. However, in some embodiments, the aft fan 115 may be supported by a rotatable shaft and/or multiple rotatable shafts that extend through each of the rear supports 108. Similar to the fore fans 114, the aft fan 115 may be selectively rotated with respect to the fuselage 102 by at least one actuator (also not shown, e.g. electric, electro-mechanical, magnetic, and/or hydraulic) in order to transition the aircraft 100 between the airplane mode and the helicopter mode. Additionally, the aft fan 115 may be substantially similar to the fore fans 114 and comprise a duct 116 having a plurality of structural supports and/or struts 118. In some embodiments, some and/or all of the struts 118 of the aft fan 115 may comprise an aileron 120 for flight control of the aircraft 100. Additionally, in some embodiments, each of the topside tails 110 may comprise a rudder 111 for flight control of the aircraft 100.

While fore fans 114 comprise a single rotor system 122, aft fan 115 comprises dual, coaxial, counter-rotating rotor systems 123a, 123b. In some embodiments, rotor systems 123a, 123b may be substantially similar to rotor systems 122 of fore fans 114. However, rotor system 123a is rotated in an opposing direction as rotor system 123b. As such, aft fan 115 is configured to stabilize the torque induced in the aircraft 100 by the fore fans 114 in a three fan 114, 115 configuration. Each of the rotor systems 123a, 123b comprises a plurality of rotor blades 125a, 125b attached to the respective rotor system 123a, 123b. The rotor blades 125a, 125b are generally disposed within the duct 116 of the aft fan 115 and configured to generate thrust when selectively counter-rotated. As such, it will be appreciated that each rotor system 123a, 123b may comprise the same number of rotor blades 125a, 125b. In the shown embodiment, each rotor system 123a, 123b comprises three rotor blades 125a, 125b, respectively. However, in other embodiments, each rotor system 123a, 123b may comprise two, four, five, six, seven, eight, and/or more rotor blades 125a, 125b each, respectively.

Figure 2:
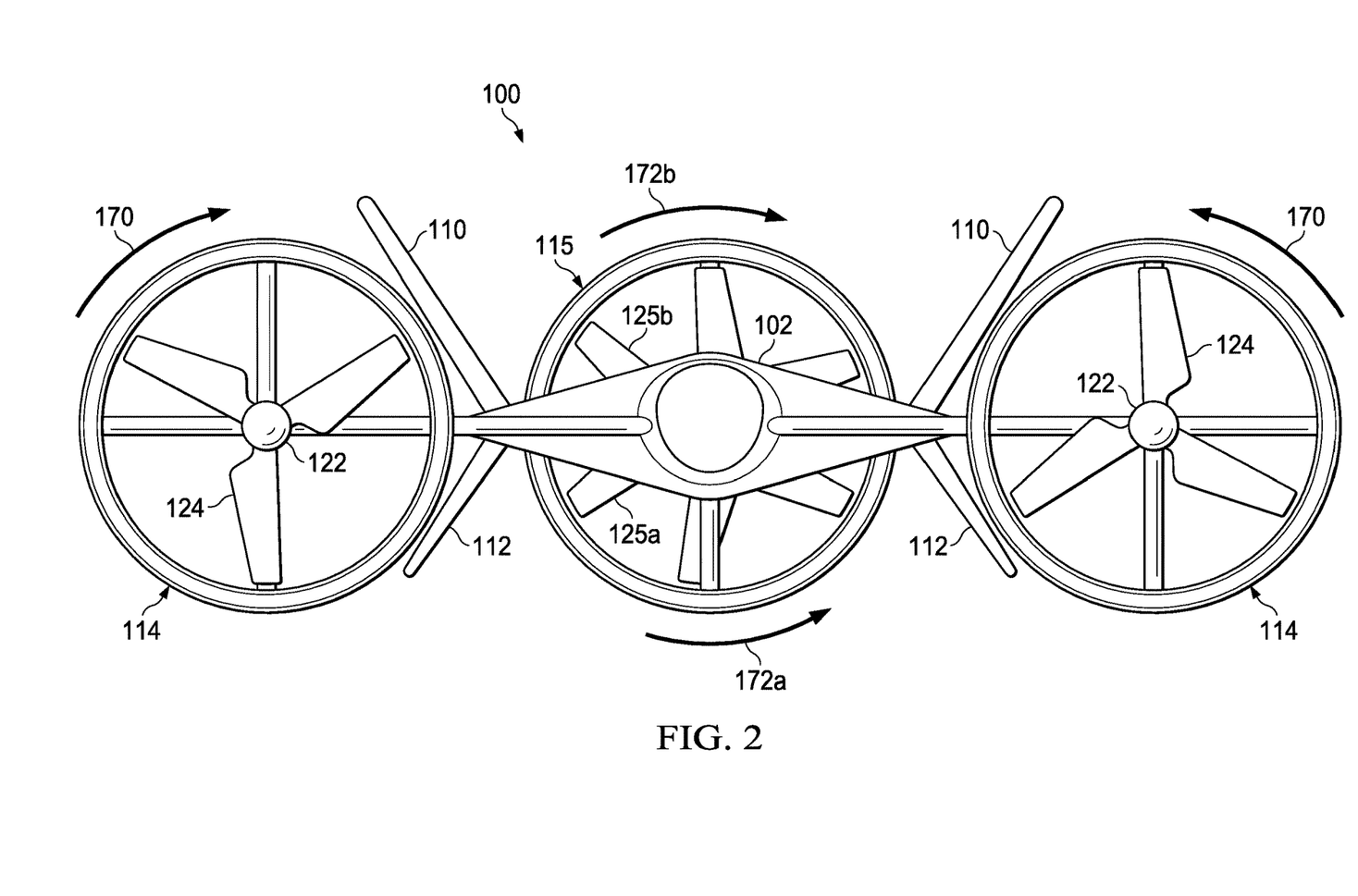
FIG. 2 is a front orthogonal view of the aircraft of FIG. 1 according to this disclosure.

Referring now to FIG. 2, a front orthogonal view of the aircraft 100 of FIG. 1 is shown according to this disclosure. Aircraft 100 is shown configured for operation in the airplane mode, in which the fans 114, 115 are selectively rotated with respect to the fuselage 102 in order to provide a more horizontally oriented thrust angle to propel the aircraft 100 forward in flight. It will be appreciated that the orientation of the aft fan 115 remains substantially similar to the orientation of the fore fans 114 with respect to the fuselage 102. The rotational directions of the rotor systems 122, and consequently respective rotor blades 124, of each of the fore fans 114 are shown by arrows 170. It will be appreciated that the rotor systems 122 of the fore fans 114 rotate in opposing directions with respect to one another. Additionally, the rotational direction of rotor system 123a, and consequently rotor blades 125a, of the aft fan 115 is shown by arrow 172a, while the rotational direction of rotor system 123b, and consequently rotor blades 125b, of the aft fan 115 is shown by arrow 172b.

Figure 3:
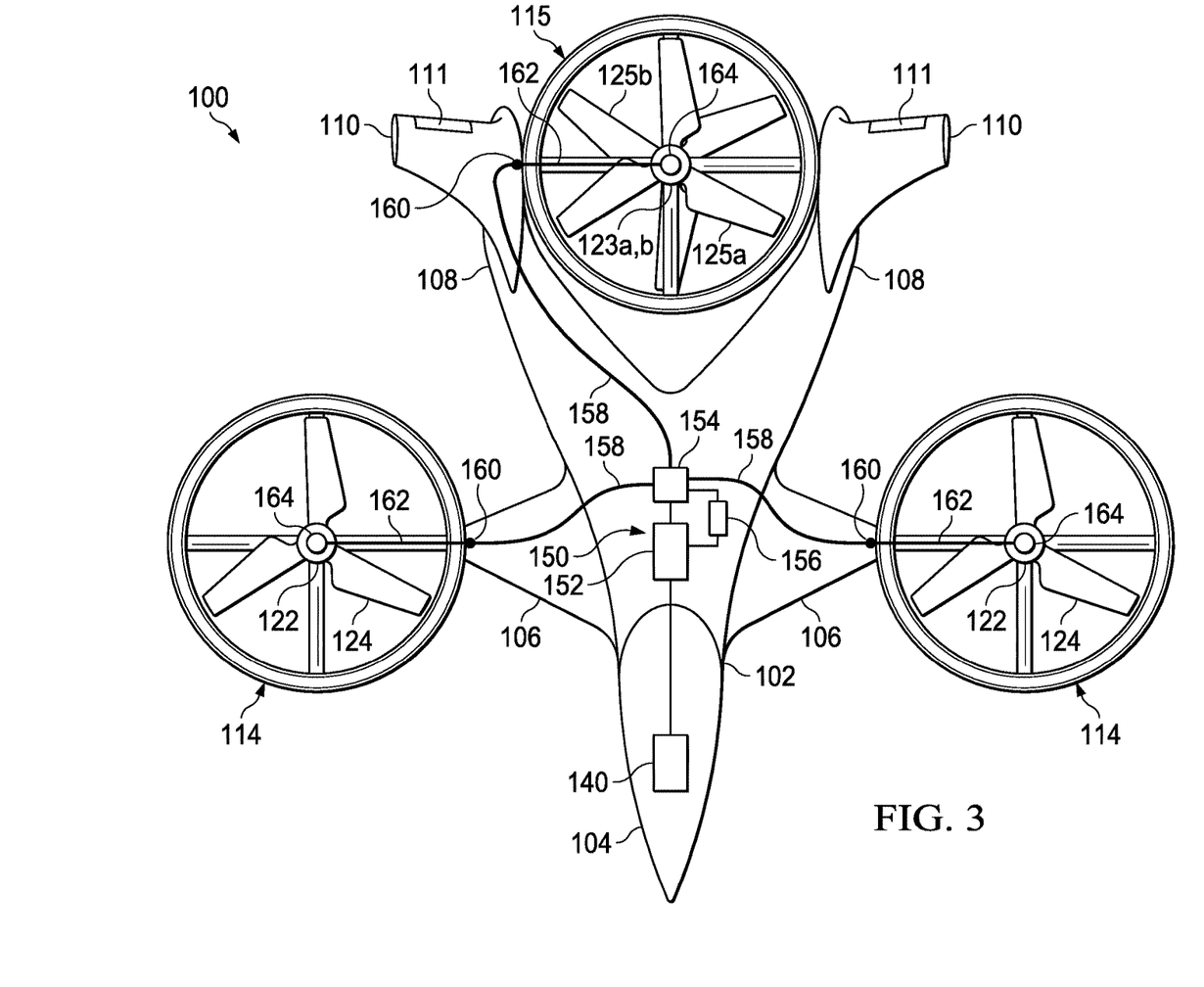
FIG. 3 is an orthogonal top view of the aircraft of FIGS. 1 and 2 according to this disclosure.

Referring now to FIG. 3, an orthogonal top view of the aircraft 100 of FIGS. 1 and 2 is shown according to this disclosure. Aircraft 100 is shown configured for operation in the helicopter mode, in which the fans 114, 115 are selectively rotated with respect to the fuselage 102 in order to provide a more vertically oriented thrust angle to propel the aircraft 100 to and from a landing zone. It will be appreciated that the orientation of the aft fan 115 remains substantially similar to the orientation of the fore fans 114 with respect to the fuselage 102. In the shown embodiment, aircraft 100 generally comprises and is controlled via a flight control system 140 and a propulsion system 150.

Flight control system 140 is generally connected in communication with propulsion system 150 and configured to selectively control the components of the propulsion system 150 to operate the aircraft 100. Flight control system 140 may comprise flight control input hardware (e.g. flight input controls) configured to receive inputs and/or commands from a pilot to control operation of the aircraft 100 and/or a plurality of sensors and/or gauges configured to provide feedback regarding operational characteristics of aircraft 100 to the flight control system 140. Additionally, flight control system 140 may be configured to selectively control the operation, orientation, rotation, position, and/or rotational speed of the fans 114, 115 of the aircraft 100. In some embodiments, the flight control system 140 may comprise fly-by-wire architecture for controlling aircraft 100. Additionally, in some embodiments, the flight control system 140 may be capable of optionally-piloted operation. Furthermore, in some embodiments, flight control system 140 may comprise collective pitch control for adjusting the pitch of rotor blades 124, 125a, 125b and rotational speed control for adjusting the rotational speed of rotor systems 122, 123a, 123b, without the need for cyclic control for controlling operation of aircraft 100.

Propulsion system 150 is generally controlled by flight control system 140 and comprises components necessary for the flight of aircraft 100. Propulsion system 150 may generally comprise a hybrid electrical system, a hybrid hydraulic system and/or combinations thereof. Propulsion system 150 comprises an internal combustion engine and/or auxiliary power unit (APU) 152, a drive unit 154 comprising at least one of a power generator and a hydraulic pump, a battery bank 156, a plurality of conduits 158, 162, optional flexible joints 160, and a plurality of motors 164. The APU 152 is generally configured to power the drive unit 154. In some embodiments, the APU 152 may comprise a 180 horsepower gas turbine. However, in some embodiments, the APU 152 may be configured to provide the appropriate power based on the power demands of the aircraft 100.

The drive unit 154 is configured to drive the motors 164. In embodiments of a hybrid electrical propulsion system 150, drive unit 154 may comprise a power generator and/or an alternator configured to generate sufficient electrical current in order to drive the electrical motors 164. For example, in some embodiments, the drive unit 154 may be configured to generate at least about 100 Kilovolt-Amps (KVA). In embodiments of a hybrid hydraulic propulsion system 150, drive unit 154 may comprise a hydraulic pump. However, in other embodiments of a hybrid hydraulic propulsion system 150, drive unit 154 may comprise both a power generator and/or alternator and a hydraulic pump, where the power generator provides power (separately and/or in conjunction with APU 152) to the hydraulic pump in order to drive hydraulic motors 164. It will be appreciated that in the embodiments of a hybrid hydraulic propulsion system 150, the hydraulic pump is capable of producing sufficient fluid pressure, velocity, and/or mass flowrate to power hydraulic motors 164.

Aircraft 100 also comprises a battery bank 156. In some embodiments, battery bank 156 may be recharged via the drive unit 154 when the drive unit 154 comprises a power generator and/or alternator. However, in some embodiments, battery bank 156 may alternatively be recharged via a current-producing component (e.g. alternator) of the APU 152. Battery bank 156 may comprise a single battery or series of batteries that comprise the primary power source providing high voltage direct current (DC) power to power the motors 164. Additionally, in some embodiments, battery bank 156 may comprise a separate emergency battery configured to provide power if the primary battery bank 156 is approaching a low energy state. Additionally, it will be appreciated that battery bank 156 may also provide power to other aircraft 100 systems, including, but not limited to the flight control system 140 and/or the landing gear.

The electrical power from the drive unit 154 and/or the battery bank 156 may be delivered to the motors 164 through a series of conduits 158, 162. In embodiments of a hybrid electrical propulsion system 150, conduits 158, 162 may comprise electrical conduits (e.g. electrically conductive wires, electrical busses, etc.). In embodiments of a hybrid hydraulic propulsion system 150, conduits 158, 162 may comprise hydraulic fluid conduits, or alternatively, a combination of electrical conduits and hydraulic fluid conduits. Furthermore, in some embodiments, flexible joints 160 may be employed between conduits 158 and conduits 162 to allow relative movement between the fore fans 114 and wings 106 and between the aft fan 115 and the rear supports 108. In embodiments of a hybrid electric propulsion system 150, flexible joints 160 may relieve tension in between electrical conduits 158 and 162 when the fans 114, 115 are selectively rotated. In embodiments of a hybrid hydraulic propulsion system 150, flexible joints 160 may comprise swivel joints that prevent kinking and/or other damage between flexible and/or solid hydraulic fluid conduits 158 and 162 when the fans 114, 115 are selectively rotated.

Motors 164 are either disposed in the hub or coupled to the hub and/or rotor mast of each rotor system 122, 123a, 123b of aircraft 100. Each motor 164 is configured to provide selective rotation of the associated rotor system 122, 123a, 123b, and consequently the associated rotor blades 124, 125a, 125b, respectively, to propel the aircraft 100. In embodiments of a hybrid electric propulsion system 150, motors 164 comprise direct drive electric motors. In some embodiments, motors 164 may produce and/or provide at least about sixty shaft horsepower (shp) to each rotor system 122, 123a, 123b. In embodiments of a hybrid hydraulic propulsion system 150, motors 164 comprise hydraulic motors. Further, in some embodiments, flight control system 140 may comprise a motor controller for each motor 164 integrated that is integrated into the flight control system 140.

Figure 4:
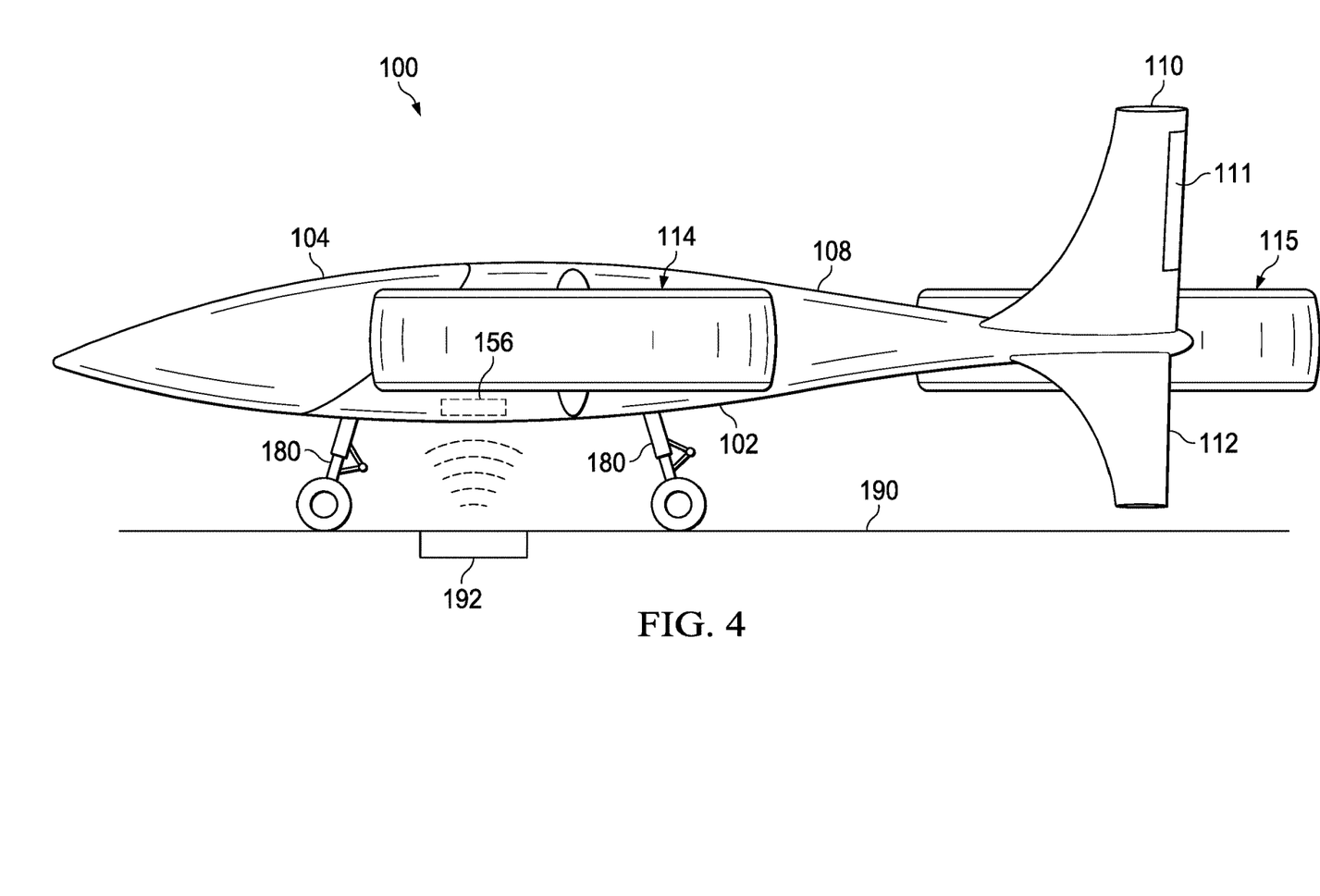
FIG. 4 is an orthogonal side view of the aircraft of FIGS. 1-3 according to this disclosure.

Referring now to FIG. 4, an orthogonal side view of the aircraft 100 of FIGS. 1-3 is shown according to this disclosure. Aircraft 100 is shown configured for operation in the helicopter mode to propel the aircraft 100 to and from landing zone 190. Aircraft 100 comprises a tricycle-style landing gear 180 configured to support the aircraft 100 upon contacting the landing zone 190. In order to employ existing helipad infrastructure and allow for better vehicle staging at landing zones 190, it will be appreciated that aircraft 100 is designed to maintain the overall footprint of the aircraft 100 no greater than the length of a normal light duty helicopter. Further, fans 114, 115 are sized to minimize power in vertical flight in order to reduce blown debris and dust hazards that may affect waiting passengers during takeoff and landing from landing zone 190. Furthermore, while aircraft 100 is stationary and/or parked on landing zone 190, the battery bank 156 may be capable of wireless charging from a wireless charging device 192 disposed on and/or embedded at least partially within the landing zone 190. In some embodiments, wireless charging of battery bank 156 from wireless charging device 192 may automatically begin upon the aircraft entering the landing zone 190 and/or upon contact of the landing gear 180 of the aircraft 100 with the landing zone 190. Further, in some embodiments, aircraft 100 and/or battery bank 156 may also comprise a safety interlock that prevents takeoff of the aircraft 100 from landing zone 190 if the battery power of the battery bank 156 is insufficient to perform a scheduled flight and/or is below a predetermined threshold.

Referring now to FIGS. 1-4, in operation, aircraft 100 is designed to provide an urban air-taxi that would relieve ground traffic congestion, reduce carbon emissions, and increase productivity, thereby providing a faster (speeds in excess of 150 knots), more efficient means of transportation. Aircraft 100 may be selectively transitioned between the helicopter mode to allow vertical takeoff and landing from a landing zone 190 and the airplane mode for more efficient forward flight. Control of roll, pitch, and yaw of aircraft 100 about axes 130, 132, 134, respectively, may be accomplished by the flight control system 140, which comprises collective pitch control for adjusting the pitch of rotor blades 124, 125a, 125b and rotational speed control for adjusting the rotational speed of rotor systems 122, 123a, 123b, without the need for cyclic control due to the unique three fan 114, 115 configuration. However, in alternative embodiments, collective pitch control may not be required, and only rotational speed control may be used by effectively controlling the rotational speed of each of the rotor systems 122, 123a, 123b to provide full flight control of pitch, roll, and yaw of aircraft 100.

When aircraft 100 is operated in the helicopter mode, roll control about axis 130 may be accomplished by varying the rotational speed of at least one of the rotor systems 122 of the fore fans 114 and/or through varying the collective pitch of the rotor blades 124 of the rotor system 122 of at least one of the fore fans 114. Accordingly, the difference in rotational speed between rotor systems 122 and/or the difference in pitch of the rotor blades 124 may induce roll in aircraft 100 and/or compensate for induced roll in aircraft 100. Pitch control about axis 132 may be accomplished by varying the rotational speed of the rotor systems 123a, 123b of the aft fan 115. Accordingly, increasing the rotational speed of the rotor systems 123a, 123b may cause the aircraft to pitch forward (nose down) about axis 132, while reducing the rotational speed of the rotor systems 123a, 123b may cause the aircraft to pitch backward (nose up). Yaw control about axis 134 may be accomplished by selectively varying the tilt angle and/or applied torque of at least one of the fore fans 114. However, in some embodiments, yaw control about axis 134 may be controlled through selective adjustment of the ailerons 120 of fore fans 114.

When aircraft 100 is operated in the airplane mode, roll, pitch, and yaw control may be accomplished in a substantially similar manner as that of a traditional airplane. As such, roll control about axis 130 may be accomplished by selectively adjusting the ailerons 120 on the struts 118 of the fore fans 114. Pitch control about axis 132 and yaw control about axis 134 may be accomplished by selectively adjusting the rudders 111 on the topside tails 110 of aircraft 100. To adjust pitch of the aircraft 100 about axis 132, the rudders 111 may be selectively adjusted together, simultaneously and/or to have a substantially similar pitch angle. Thus, to adjust yaw about axis 134, the rudders 111 may be selectively adjusted individually and/or disparate from one another to have different pitch angles. However, in alternative embodiments, the struts 118 of the aft fan 115 may comprise ailerons 120 that may be selectively adjusted and/or tilted to adjust pitch about axis 132 and/or yaw about axis 134. Furthermore, it will be appreciated that control of aircraft 100 may also be accomplished through selective rotation of the fore fans 114 with respect to the fuselage and/or adjusting the speed of the aircraft 100, since ducts 116 may be configured to provide lift to the aircraft 100.

Since aircraft 100 is designed to provide an urban air-taxi, aircraft 100 may generally be configured to be piloted, optionally piloted, and/or pilotless. Passengers of aircraft 100 may arrange flights via a cellular telephone application, computer, or application specific terminal and/or other device. Thus, aircraft 100 can utilize semi-autonomous navigation to carry passengers from one location to another. Pilot controls on the aircraft are not required in optionally piloted and pilotless applications. However, aircraft 100 may comprise a passenger interface that would allow selection of a destination and/or alternative destination by a passenger when necessary that communicates with the flight control system 140 and/or other navigation system through a wired and/or wireless communication connection to selectively provide transportation to the selected destination.

Aircraft 100 may be selectively transitioned between the helicopter mode to allow vertical takeoff and landing from a landing zone 190 and the airplane mode for more efficient forward flight that results in lower emissions. In some embodiments, aircraft 100 may produce less emissions than a standard automobile travelling a similar distance. Accordingly, it will be appreciated that aircraft 100 utilizes quiet, low emissions electric and/or hydraulic propulsion provided via propulsion system 150, which may be particularly desirable in an urban VTOL commuter-type aircraft 100 where with hundreds, and potentially thousands of aircraft 100, moving passengers to and from city centers and/or across metropolitan areas, whereas relying on carbon-based propulsion would simply move a pollution problem from the ground to the air. Further, electric and/or hydraulic propulsion systems 150 can also realize the efficiency in eliminating the need for heavy gearboxes associated with conventional aircraft. Aircraft 100 is therefore capable of providing improved travel across to and from city centers and/or across metropolitan areas that reduces emissions while allowing faster, more convenient, and more efficient travel (flight times in excess of one hour) throughout a metropolitan area and/or between bordering states.

Figure 5:
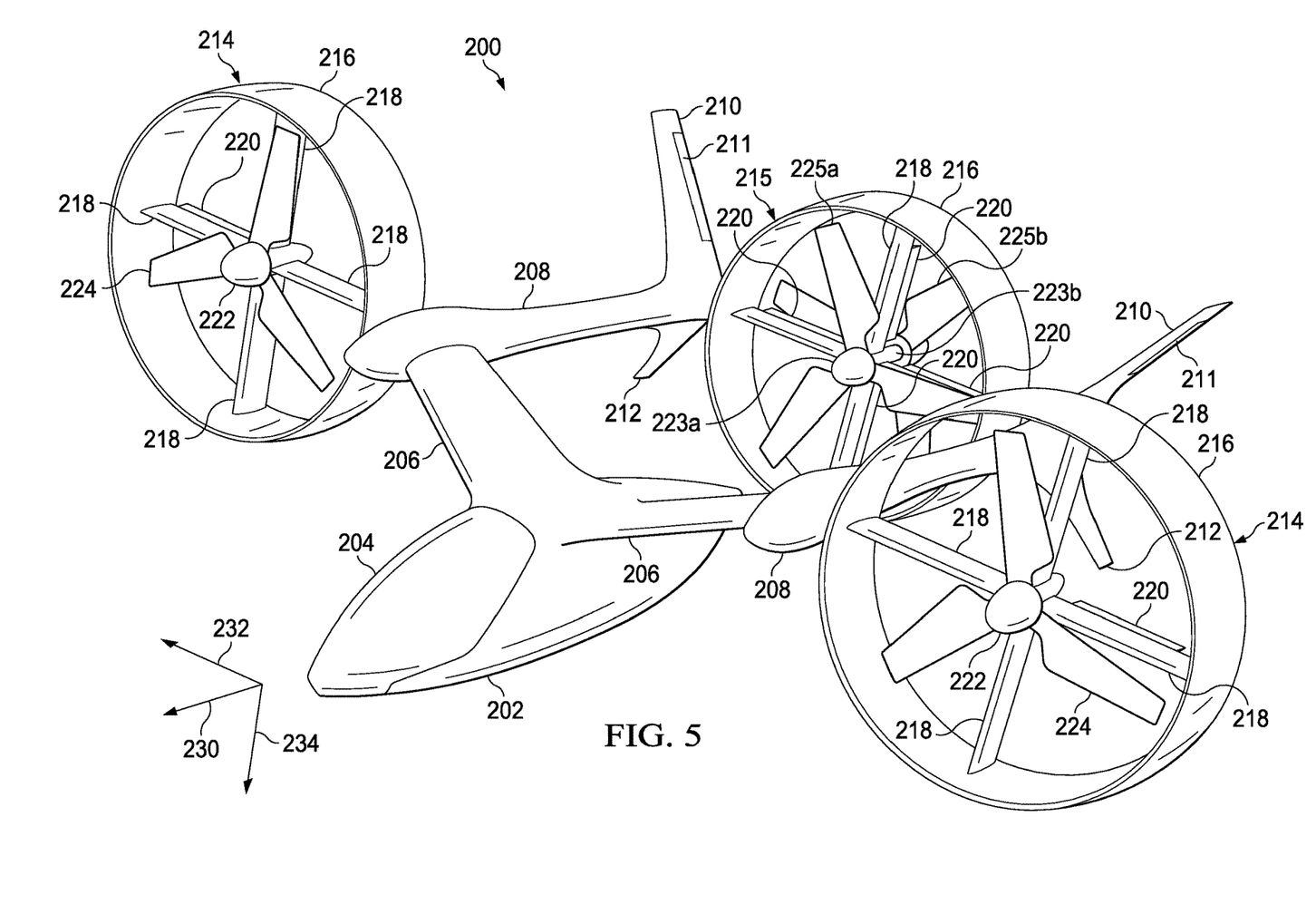
FIG. 5 is an oblique view of another embodiment of an aircraft according to this disclosure.

Referring now to FIG. 5, an oblique view of another embodiment of an aircraft 200 is shown according to this disclosure. Aircraft 200 is substantially similar to aircraft 100. Aircraft 200 comprises substantially similar components as aircraft 100 of a fuselage 202, a cockpit and/or passenger compartment 204, a plurality of wings 206 extending from the fuselage 202, a plurality of fore fans 214, and an aft fan 215. However, as opposed to aircraft 100, wings 206 of aircraft 200 are dihedral wings that extend upwardly at an angle. Additionally, as opposed to rear supports 108 that extend from the fuselage 102, aircraft 200 comprises booms 208 coupled to and extending rearward from the wings 206. The booms 208 comprise a topside tail 210 having a rudder 211 and a bottom side tail 212 that collectively form the empennage of the aircraft 200. Accordingly, the fore fans 214 are supported by a rotatable shaft (not shown) coupled to the fore fans 214 and extending at least partially through the wings 206 and the forward portion of the booms 208. Further, the aft fan 215 is supported by at least one rotatable shaft (not shown) coupled to the aft fan 215 and extending at least partially through a rearward portion of the booms 208 and/or empennage of the aircraft 200.

Additionally, similarly to aircraft 100, the fore fans 214 of aircraft 200 comprise a duct 216 having a plurality of structural supports and/or struts 218. Additionally, in some embodiments, some and/or all of the struts 218 of each fore fan 214 may comprise an aileron 220. In the shown embodiment, however, only the outer horizontally oriented strut 218 of each fan 214 comprises an aileron 220. Additionally, each fore fan 214 also comprises a rotor system 222 comprising a plurality of rotor blades 224. Furthermore, similarly to aircraft 100, the aft fan 215 of aircraft 200 comprises a duct 216 having a plurality of structural supports and/or struts 218. In some embodiments, some and/or all of the struts 218 of the aft fan 215 may comprise an aileron 220 for flight control of the aircraft 200. Aft fan 215 also comprises dual, coaxial, counter-rotating rotor systems 223a, 223b, each comprising a plurality of rotor blades 225a, 225b attached to the respective rotor system 223a, 225b.

Figure 6:
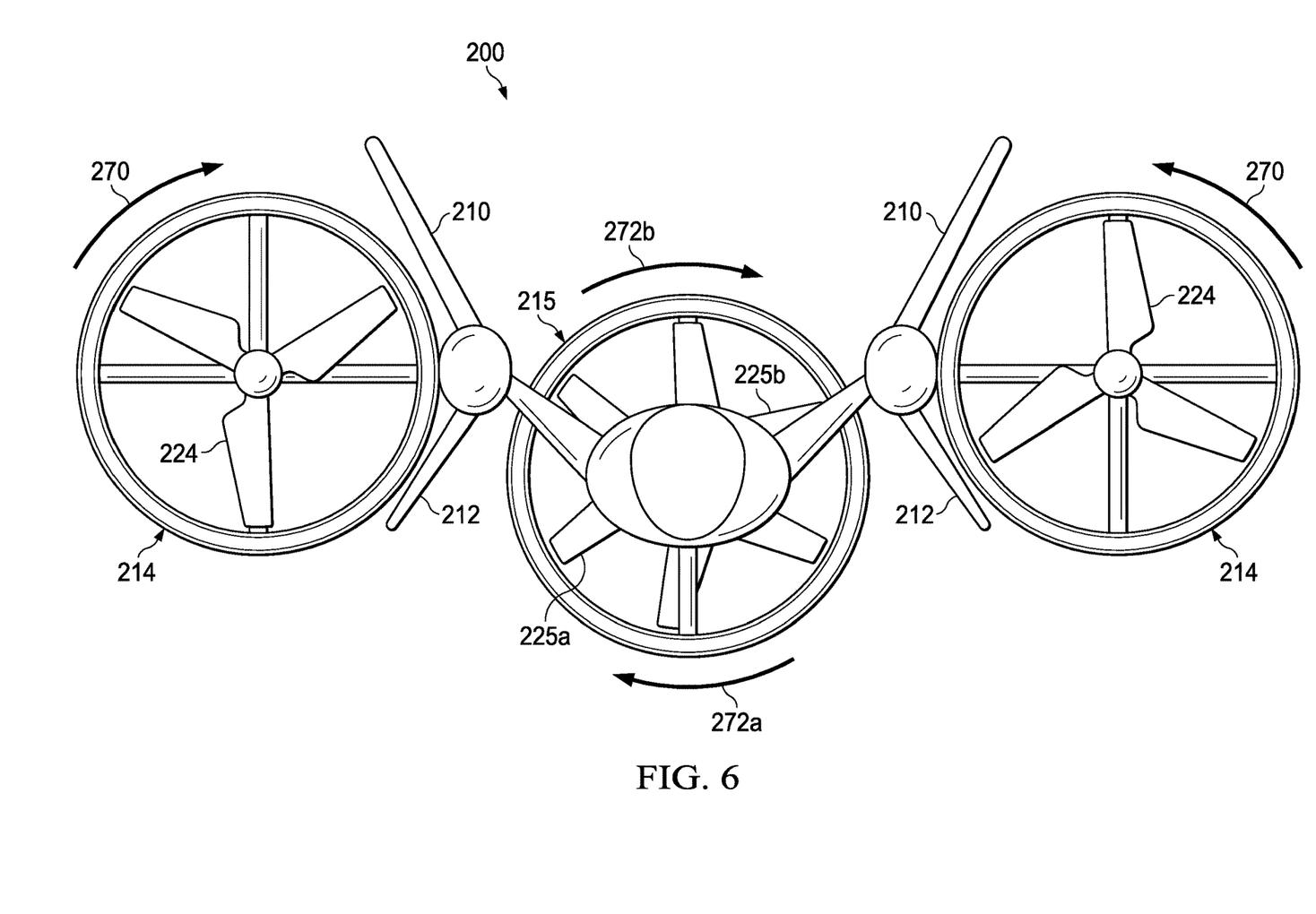
FIG. 6 is a front orthogonal view of the aircraft of FIG. 5 according to this disclosure.

Referring now to FIG. 6, a front orthogonal view of the aircraft 200 of FIG. 5 is shown according to this disclosure. Rotational directions of the rotor systems 222, 223a, 223b are substantially similar to the rotational directions of rotor systems 122, 123a, 123b of aircraft 100. The rotational directions of the rotor systems 222, and consequently respective rotor blades 224, of each of the fore fans 214 are shown by arrows 270. It will be appreciated that the rotor systems 222 of the fore fans 214 rotate in opposing directions with respect to one another. Additionally, the rotational direction of rotor system 223a, and consequently rotor blades 225a, of the aft fan 215 is shown by arrow 272a, while the rotational direction of rotor system 223b, and consequently rotor blades 225b, of the aft fan 215 is shown by arrow 272b.

Figure 7:
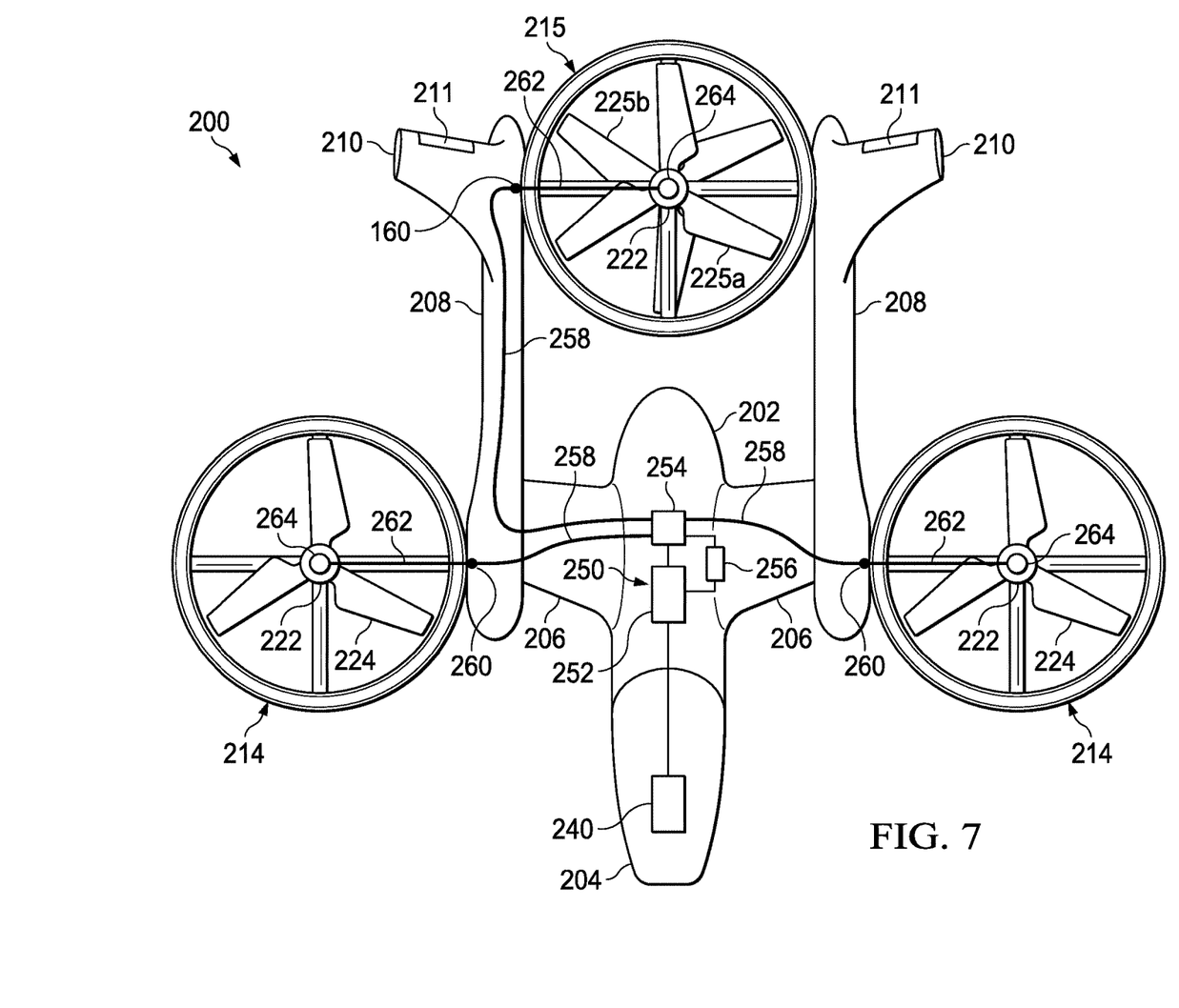
FIG. 7 is an orthogonal top view of the aircraft of FIGS. 5 and 6 according to this disclosure.

Referring now to FIG. 7, an orthogonal top view of the aircraft of FIGS. 5 and 6 is shown according to this disclosure. Aircraft 200 is shown configured for operation in the helicopter mode and may be operated and controlled in a substantially similar manner to aircraft 100. Accordingly, aircraft 100 comprises a flight control system 240 and a propulsion system 250 substantially similar to flight control system 140 and propulsion system 150, respectively, of aircraft 100. Flight control system 240 is generally connected in communication with propulsion system 250 and configured to selectively control the components of the propulsion system 250 to operate the aircraft 200. Accordingly, flight control system 240 may comprise fly-by-wire architecture for controlling aircraft 200. Furthermore, in some embodiments, flight control system 240 may comprise collective pitch control for adjusting the pitch of rotor blades 224, 225a, 225b and rotational speed control for adjusting the rotational speed of rotor systems 222, 223a, 223b, without the need for cyclic control for controlling operation of aircraft 200.

Propulsion system 250 is generally controlled by flight control system 240 and comprises components necessary for the flight of aircraft 200. Propulsion system 250 may generally comprise a hybrid electrical system, a hybrid hydraulic system and/or combinations thereof that are substantially similar to propulsion system 150 of aircraft 100. Accordingly, propulsion system 250 comprises an internal combustion engine and/or auxiliary power unit (APU) 252, a drive unit 254 comprising at least one of a power generator and a hydraulic pump, a battery bank 256, a plurality of conduits 258, 262, optional flexible joints 260, and a plurality of motors 264 either disposed in the hub or coupled to the hub and/or rotor mast of each rotor system 222, 223a, 223b of aircraft 200 that is configured to provide selective rotation of the associated rotor system 222, 223a, 223b, and consequently the associated rotor blades 224, 225a, 225b, respectively, to propel aircraft 200.

Figure 8:
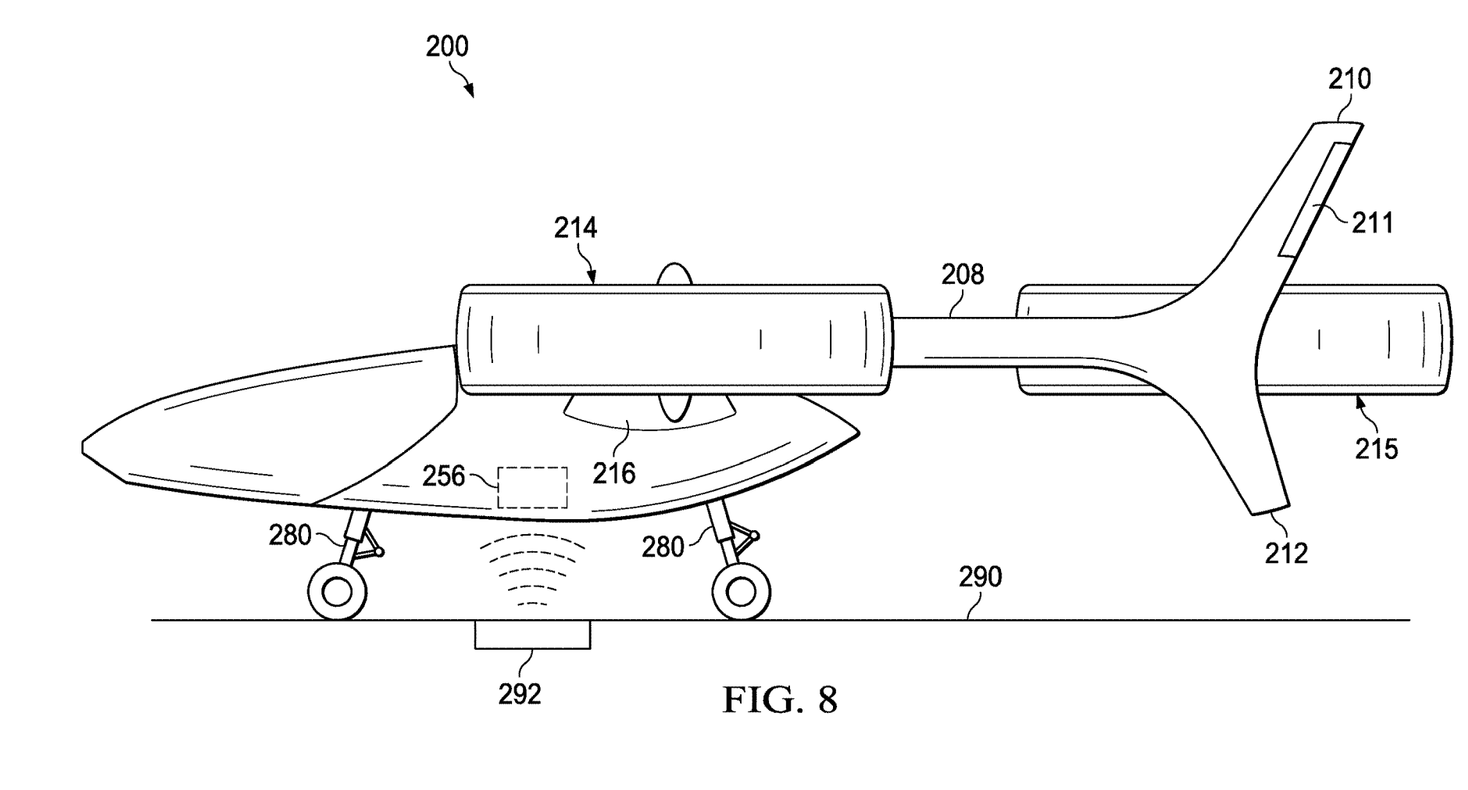
FIG. 8 is an orthogonal side view of the aircraft of FIGS. 5-7 according to this disclosure.

Referring now to FIG. 8, an orthogonal side view of the aircraft 200 of FIGS. 5-7 is shown according to this disclosure. Aircraft 200 is shown configured for operation in the helicopter mode to propel the aircraft 200 to and from landing zone 290 in a substantially similar manner to aircraft 100. Aircraft 200 comprises a tricycle-style landing gear 280 configured to support the aircraft 200 upon contacting the landing zone 290. It will be appreciated that aircraft 200 may also be designed to maintain the overall footprint no greater than the length of a normal light duty helicopter in order to employ existing helipad infrastructure and allow for better vehicle staging at landing zones 290. Similarly to aircraft 100, battery bank 256 of aircraft 200 may also be capable of wireless charging from a wireless charging device 292 disposed on and/or embedded at least partially within the landing zone 290. As such, wireless charging of battery bank 256 from wireless charging device 292 may automatically begin upon the aircraft 200 entering the landing zone 290 and/or upon contact of the landing gear 280 of the aircraft 200 with the landing zone 290. Further, in some embodiments, aircraft 200 and/or battery bank 256 may also comprise a safety interlock that prevents takeoff of the aircraft 200 from landing zone 290 if the battery power of the battery bank 256 is insufficient to perform a scheduled flight and/or is below a predetermined threshold.

As shown, aircraft 200 comprises dihedral wings 206 that elevate the fans 214, 215 higher from the landing zone 290 as compared to aircraft 100. In some embodiments, the additional clearance between the fans 214, 215 and the landing zone 290 may provide better safety to passengers on the loading zone 290, less wind turbulence, and/or less noise at the ground level. However, it will be appreciated that in some embodiments, wings 206 may comprise less than about 6 degrees of dihedral while maintaining adequate clearance between fans 214, 215 and landing zone 290. However, in other embodiments, wings 206 may comprise less than about 10 degrees of dihedral while maintaining adequate clearance between fans 214, 215 and landing zone 290.

Referring now to FIGS. 5-8, in operation, aircraft 200 is designed to provide an urban air-taxi that would relieve ground traffic congestion, reduce carbon emissions, and increase productivity, thereby providing a faster, more efficient means of transportation in a substantially similar manner to aircraft 100. Aircraft 100 may be selectively transitioned between the helicopter mode to allow vertical takeoff and landing from a landing zone 290 and the airplane mode for more efficient forward flight. Additionally, control of roll, pitch, and yaw of aircraft 200 about axes 230, 232, 234, respectively, may be accomplished by the flight control system 240, which comprises collective pitch control for adjusting the pitch of rotor blades 224, 225a, 225b and rotational speed control for adjusting the rotational speed of rotor systems 222, 223a, 223b, without the need for cyclic control due to the unique three fan 214, 215 configuration, in each of the airplane mode and the helicopter mode in a substantially similar manner to aircraft 100. As such, it will be appreciated that aircraft 200 may provide substantially similar benefits as aircraft 100 by providing improved travel across to and from city centers and/or across metropolitan areas that reduces emissions while allowing faster, more convenient, and more efficient travel (flight times in excess of one hour) throughout a metropolitan area and/or between bordering states.

Figure 9:
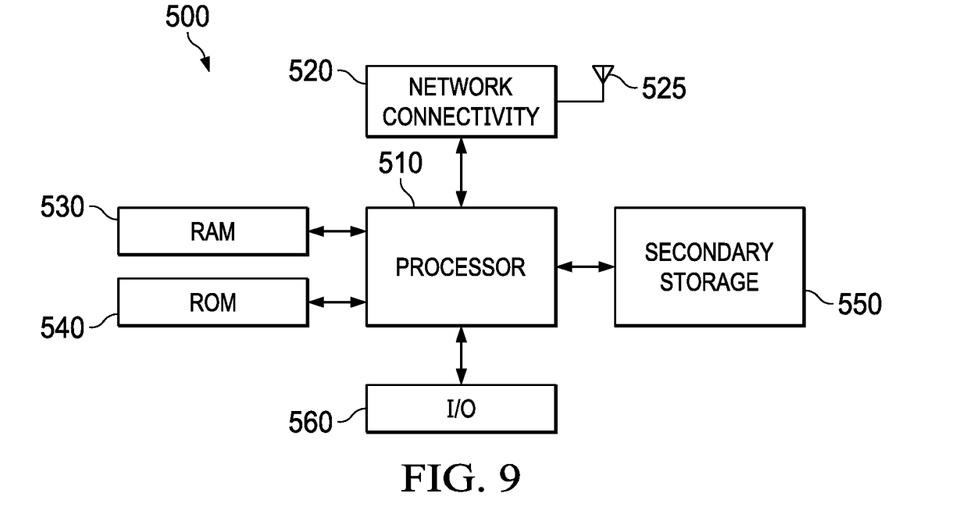
FIG. 9 is a schematic diagram of a general-purpose processor (e.g. electronic controller or computer) system suitable for implementing the embodiments of this disclosure.

Referring now to FIG. 9, a schematic diagram of a general-purpose processor (e.g. electronic controller or computer) system 500 suitable for implementing the embodiments of this disclosure is shown. System 500 that includes a processing component and/or processor 510 suitable for implementing one or more embodiments disclosed herein. In particular, one or more of the flight control systems 140, 240 and/or other electronic systems disclosed herein may comprise one or more systems 500. In addition to the processor 510 (which may be referred to as a central processor unit or CPU), the system 500 might include network connectivity devices 520, random access memory (RAM) 530, read only memory (ROM) 540, secondary storage 550, and input/output (I/O) devices 560. In some cases, some of these components may not be present or may be combined in various combinations with one another or with other components not shown. These components might be located in a single physical entity or in more than one physical entity. Any actions described herein as being taken by the processor 510 might be taken by the processor 510 alone or by the processor 510 in conjunction with one or more components shown or not shown in the system 500. It will be appreciated that the data described herein can be stored in memory and/or in one or more databases.

The processor 510 executes instructions, codes, computer programs, or scripts that it might access from the network connectivity devices 520, RAM 530, ROM 540, or secondary storage 550 (which might include various disk-based systems such as hard disk, floppy disk, optical disk, or other drive). While only one processor 510 is shown, multiple processors 510 may be present. Thus, while instructions may be discussed as being executed by processor 510, the instructions may be executed simultaneously, serially, or otherwise by one or multiple processors 510. The processor 510 may be implemented as one or more CPU chips and/or application specific integrated chips (ASICs).

The network connectivity devices 520 may take the form of modems, modem banks, Ethernet devices, universal serial bus (USB) interface devices, serial interfaces, token ring devices, fiber distributed data interface (FDDI) devices, wireless local area network (WLAN) devices, radio transceiver devices such as code division multiple access (CDMA) devices, global system for mobile communications (GSM) radio transceiver devices, worldwide interoperability for microwave access (WiMAX) devices, and/or other well-known devices for connecting to networks. These network connectivity devices 520 may enable the processor 510 to communicate with the Internet or one or more telecommunications networks or other networks from which the processor 510 might receive information or to which the processor 510 might output information.

The network connectivity devices 520 might also include one or more transceiver components 525 capable of transmitting and/or receiving data wirelessly in the form of electromagnetic waves, such as radio frequency signals or microwave frequency signals. Alternatively, the data may propagate in or on the surface of electrical conductors, in coaxial cables, in waveguides, in optical media such as optical fiber, or in other media. The transceiver component 525 might include separate receiving and transmitting units or a single transceiver. Information transmitted or received by the transceiver 525 may include data that has been processed by the processor 510 or instructions that are to be executed by processor 510. Such information may be received from and outputted to a network in the form, for example, of a computer data baseband signal or signal embodied in a carrier wave. The data may be ordered according to different sequences as may be desirable for either processing or generating the data or transmitting or receiving the data. The baseband signal, the signal embedded in the carrier wave, or other types of signals currently used or hereafter developed may be referred to as the transmission medium and may be generated according to several methods well known to one skilled in the art.

The RAM 530 might be used to store volatile data and perhaps to store instructions that are executed by the processor 510. The ROM 540 is a non-volatile memory device that typically has a smaller memory capacity than the memory capacity of the secondary storage 550. ROM 540 might be used to store instructions and perhaps data that are read during execution of the instructions. Access to both RAM 530 and ROM 540 is typically faster than to secondary storage 550. The secondary storage 550 is typically comprised of one or more disk drives or tape drives and might be used for non-volatile storage of data or as an over-flow data storage device if RAM 530 is not large enough to hold all working data. Secondary storage 550 may be used to store programs or instructions that are loaded into RAM 530 when such programs are selected for execution or information is needed.

The I/O devices 560 may include liquid crystal displays (LCDs), touchscreen displays, keyboards, keypads, switches, dials, mice, track balls, voice recognizers, card readers, paper tape readers, printers, video monitors, transducers, sensors, or other well-known input or output devices. Also, the transceiver 525 might be considered to be a component of the I/O devices 560 instead of or in addition to being a component of the network connectivity devices 520. Some or all of the I/O devices 560 may be substantially similar to various components disclosed herein and/or may be components of any of the flight control systems 140, 240 and/or other electronic systems disclosed herein.

Figure 10:
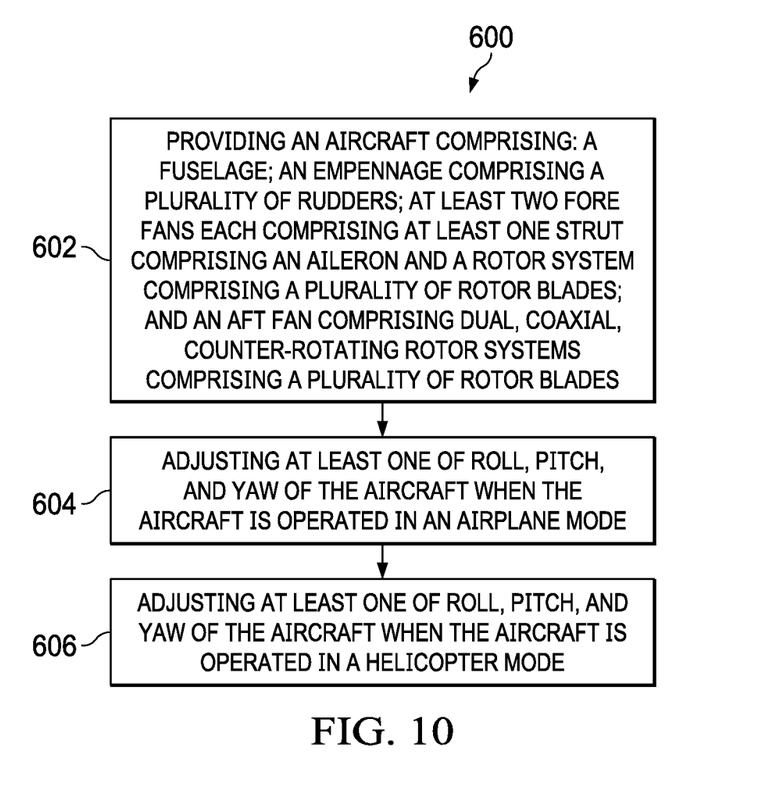
FIG. 10 is a flowchart of a method of operating an aircraft according to this disclosure.

Referring now to FIG. 10, a flowchart of a method 600 of operating an aircraft 100, 200 is shown according to this disclosure. Method 600 begins at block 602 by providing an aircraft 100, 200 comprising: a fuselage 102, 202; an empennage 108, 110, 112, 208, 210, 212, at least two fore fans 114, 214 each fore fan 114, 214 comprising at least one strut 118, 218 comprising an aileron 220 and a rotor system 122, 222 comprising a plurality of rotor blades 124, 224; and an aft fan 115, 215 comprising dual, coaxial, counter-rotating rotor systems 123a, 123b, 223a, 223b comprising a plurality of rotor blades 125a, 125b, 225a, 225b.

Method 600 may continue at block 604 by adjusting at least one of roll, pitch, and yaw of the aircraft 100, 200 when the aircraft 100, 200 is operated in an airplane mode. When aircraft 100, 200 is operated in the airplane mode, roll control about axis 130, 230 may be accomplished by selectively adjusting the ailerons 120, 220 on the struts 118, 218 of the fore fans 114, 214, pitch control about axis 132, 232 may be accomplished by selectively adjusting rudders 111, 211 collectively on the empennage of aircraft 100, 200, and yaw control about axis 134, 234 may be accomplished by selectively adjusting rudders 111, 211 disparate from one another to have different pitch angles on the empennage of aircraft 100, 200.

Method 600 may continue at block 606 by adjusting at least one of roll, pitch, and yaw of the aircraft 100, 200 when the aircraft 100, 200 is operated in a helicopter mode. When aircraft 100, 200 is operated in the helicopter mode, roll control about axis 130, 230 may be accomplished by varying the rotational speed of at least one of the rotor systems 122, 222 of the fore fans 114, 214 and/or through varying the collective pitch of the rotor blades 124, 224 of the rotor system 122, 222 of at least one of the fore fans 114, 115, pitch control about axis 132, 232 may be accomplished by varying the rotational speed of the rotor systems 123a, 123b, 223a, 223b of the aft fan 115, 215, and yaw control about axis 134, 234 may be accomplished by selectively varying the tilt angle and/or applied torque of at least one of the fore fans 114, 214. However, in some embodiments, yaw control about axis 134, 234 may be controlled through selective adjustment of the ailerons 120, 220 of fore fans 114, 214. Furthermore, it will be appreciated that during the transition of the aircraft 100, 200 between the aircraft mode and helicopter mode, referred to as a transition mode, adjustment of roll, pitch, and yaw may be controlled and/or adjusted using any one and/or combination of the aforementioned techniques.

At least one embodiment is disclosed, and variations, combinations, and/or modifications of the embodiment(s) and/or features of the embodiment(s) made by a person having ordinary skill in the art are within the scope of this disclosure. Alternative embodiments that result from combining, integrating, and/or omitting features of the embodiment(s) are also within the scope of this disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 5 percent, . . . 50 percent, 51 percent, 52 percent, . . . , 95 percent, 96 percent, 95 percent, 98 percent, 99 percent, or 100 percent. Moreover, any numerical range defined by two R numbers as defined in the above is also specifically disclosed.

Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present invention. Also, the phrases "at least one of A, B, and C" and "A and/or B and/or C" should each be interpreted to include only A, only B, only C, or any combination of A, B, and C.

What is claimed is:

1. An aircraft, comprising:
   a fuselage;
   an empennage, comprising a rear support extending longitudinally from the fuselage and the rear support supporting both a top side tail and a bottom side tail that extend laterally from the rear support;

a plurality of fore fans, each fore fan comprising a rotor system comprising a plurality of rotor blades and the fore fans being carried by opposing main wings; and
an aft fan comprising a first rotor system and a second rotor system, each of the first rotor system and the second rotor system comprising a plurality of rotor blades, wherein the first rotor system and the second rotor system are counter-rotating relative to each other;
wherein the aircraft is configured for operation in each of an airplane mode, a transition mode, and a helicopter mode;
wherein the aft fan is generally laterally centered between the plurality of fore fans and is configured to rotate about a lateral axis;
wherein when the aircraft is configured in the helicopter mode, the aft fan comprises the most rearward portion of the aircraft;
wherein no stationary portion of the aircraft is disposed directly behind any of the plurality of fore fans when the aircraft is viewed from the front; and
wherein when the aircraft is viewed orthographically from a front of the aircraft, the plurality of fore fans are at least partially vertically bounded from above by the top side tail and the plurality of fore fans are at least partially vertically bounded from below by the bottom side tail, without obscuring view of any portion of either of the top side tail and bottom side tail.

2. The aircraft of claim 1, further comprising: a flight control system configured to control the aircraft using fly-by-wire architecture.

3. The aircraft of claim 2, wherein the flight control system utilizes collective pitch control for adjusting the pitch of the plurality of rotor blades and rotational speed control for adjusting a rotational speed of the rotor systems of the fore fan and the first rotor system and second rotor system of the aft fan to the exclusion of cyclic control.

4. The aircraft of claim 1, further comprising: a propulsion system that is at least one of a hybrid electrical propulsion system and a hybrid hydraulic propulsion system.

5. The aircraft of claim 4, wherein the propulsion system comprises an auxiliary power unit (APU), a drive unit, a battery bank, and a plurality of motors configured to selectively rotate the rotor systems of the fore fan and the first rotor system and second rotor system of the aft fan.

6. The aircraft of claim 5, wherein the drive unit comprises a power generator wherein the propulsion system comprises the hybrid electric propulsion system, and wherein the drive unit comprises a hydraulic pump when the propulsion system comprises the hybrid hydraulic propulsion system.

7. The aircraft of claim 5, wherein the battery bank is configured for wireless charging.

8. The aircraft of claim 1, further comprising: a tricycle-style landing gear configured to support the aircraft upon contacting a landing zone.

9. The aircraft of claim 1, wherein the aircraft comprises a vertical takeoff and landing (VTOL) urban air-taxi configured to be piloted, and wherein the aircraft comprises a passenger compartment configured to carry at least one pilot and at least one passenger.

10. The aircraft of claim 1, wherein the aircraft comprises a vertical takeoff and landing (VTOL) urban air-taxi configured to be at least one of optionally piloted and pilotless, and wherein the aircraft comprises a passenger compartment configured to carry a plurality of passengers.

11. A method of operating an aircraft, comprising:
providing an aircraft comprising: a fuselage; an empennage comprising a plurality of rudders; a plurality of fore fans, each fore fan comprising at least one strut comprising an aileron and a rotor system comprising a plurality of rotor blades and the fore fans being carried by opposing main wings; and an aft fan comprising dual, coaxial, counter-rotating rotor systems, each counter-rotating rotor system comprising a plurality of rotor blades, wherein the empennage comprises a rear support extending longitudinally from the fuselage and the rear support supporting both a top side tail and a bottom side tail that extend laterally from the rear support; and
adjusting at least one of roll, pitch, and yaw of the aircraft when the aircraft is operated in at least one of an airplane mode and a helicopter mode;
wherein the aft fan is generally laterally centered between the plurality of fore fans and is configured to rotate about a lateral axis;
wherein when the aircraft is configured in the helicopter mode, the aft fan comprises the most rearward portion of the aircraft;
wherein no stationary portion of the aircraft is disposed directly behind any of the plurality of fore fans when the aircraft is viewed from the front; and
wherein when the aircraft is viewed from a front of the aircraft, the plurality of fore fans are at least partially vertically bounded from above by the top side tail and the plurality of fore fans are at least partially vertically bounded from below by the bottom side tail, without obscuring view of any portion of either of the top side tail and bottom side tail.

12. The method of claim 11, wherein when the aircraft is operated in the airplane mode, adjusting roll of the aircraft is accomplished by selectively adjusting the ailerons on the struts of the fore fans.

13. The method of claim 11, wherein when the aircraft is operated in the airplane mode, adjusting pitch of the aircraft is accomplished by selectively adjusting the rudders on the empennage collectively, and adjusting yaw of the aircraft is accomplished by selectively adjusting the rudders on the empennage disparate from one another to have different pitch angles.

14. The method of claim 11, wherein when the aircraft is operated in the helicopter mode, adjusting roll of the aircraft is accomplished by at least one of varying a rotational speed of at least one of the rotor systems of the fore fans and varying the collective pitch of the rotor blades of the rotor systems of at least one of the fore fans.

15. The method of claim 11, wherein when the aircraft is operated in the helicopter mode, adjusting pitch of the aircraft is accomplished by varying a rotational speed of the counter-rotating rotor systems of the aft fan.

16. The method of claim 11, wherein when the aircraft is operated in the helicopter mode, adjusting yaw is accomplished by at least one of selectively varying at least one of a tilt angle and an applied torque of at least one of the fore fans and selective adjustment of the ailerons on the struts of the fore fans.

17. The method of claim 11, wherein the plurality of rudders are carried by at least one of the top side tail and the bottom side tail.

18. The aircraft of claim 1, further comprising:
a rudder carried the top side tail and the bottom side tail.

19. The aircraft of claim 1, further comprising:
a plurality of rudders, at least one of the plurality of rudders being carried by the top side tail and at least one of the plurality of rudders being carried by the bottom side tail.

\* \* \* \* \*